United States Patent
Sawada

(10) Patent No.: US 6,618,340 B1
(45) Date of Patent: Sep. 9, 2003

(54) TRAY LOADING TYPE STORAGE MEDIUM DRIVE APPARATUS WITH MOVABLE CLAW PIECES FOR SUPPORTING STORAGE MEDIUM

(75) Inventor: Akihiko Sawada, Gunma (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/562,186

(22) Filed: May 2, 2000

(30) Foreign Application Priority Data

May 7, 1999 (JP) .......................................... 11-127765

(51) Int. Cl.$^7$ .............................................. G11B 17/04
(52) U.S. Cl. ...................................................... 369/77.1
(58) Field of Search ............................... 369/75.2, 77.1, 369/75.1, 258

(56) References Cited

U.S. PATENT DOCUMENTS

| | | | | |
|---|---|---|---|---|
| 4,928,271 A | * | 5/1990 | Verhagen | 369/273 |
| 4,980,883 A | * | 12/1990 | Mutou et al. | 362/291 |
| 5,793,729 A | * | 8/1998 | Soga et al. | 369/77.1 |
| 5,864,529 A | * | 1/1999 | Liao et al. | 369/77.1 |
| 5,878,013 A | * | 3/1999 | Maeda et al. | 369/77.1 |
| 6,052,352 A | * | 4/2000 | Liou | 369/77.1 |
| 6,122,240 A | * | 9/2000 | Kim | 369/77.1 |

FOREIGN PATENT DOCUMENTS

| | | | | |
|---|---|---|---|---|
| JP | 06111444 | * | 4/1994 | G11B/17/04 |
| JP | 08-007430 | * | 4/1994 | G11B/17/04 |
| JP | 06-333311 | * | 12/1994 | G11B/17/04 |
| JP | 8-45153 | | 2/1996 | |
| JP | 8-45157 | | 2/1996 | |
| JP | 08045153 | * | 2/1996 | G11B/17/04 |
| JP | 10-083606 | * | 3/1998 | G11B/17/04 |
| JP | 10-199088 | | 7/1998 | |

* cited by examiner

Primary Examiner—David L. Ometz
Assistant Examiner—Christopher R Beacham
(74) Attorney, Agent, or Firm—Sughrue Mion, PLLC

(57) ABSTRACT

In a tray loading type storage medium drive apparatus, a plurality of circular recesses for accommodating a plurality of kinds of circular storage media having different diameters to each other are coaxially formed on a tray. A plurality of movable claw pieces are provided along an outer periphery of an outermost one of the circular recesses. The movable claw pieces are capable of partly protruding over each of the circular recesses.

12 Claims, 9 Drawing Sheets

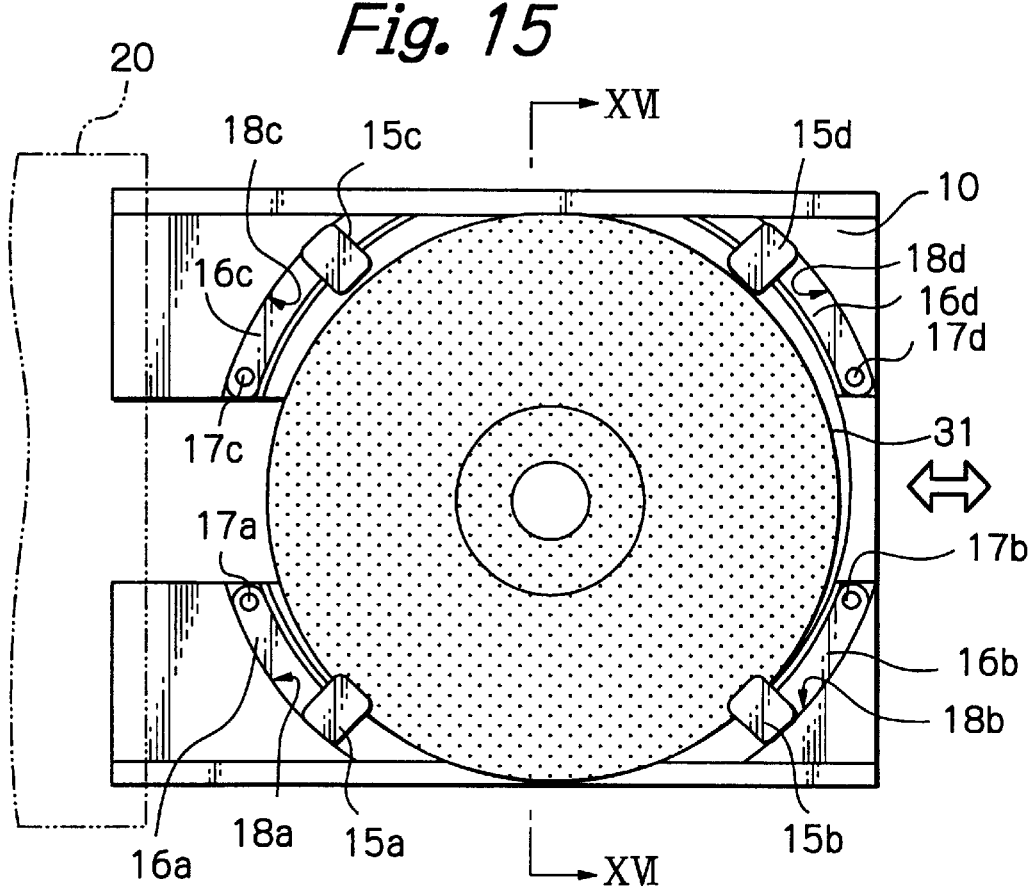
Fig. 15
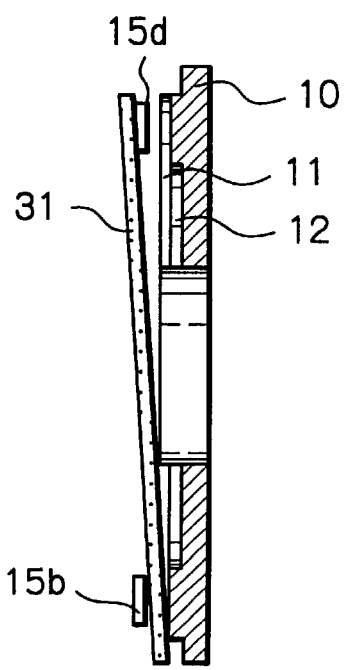 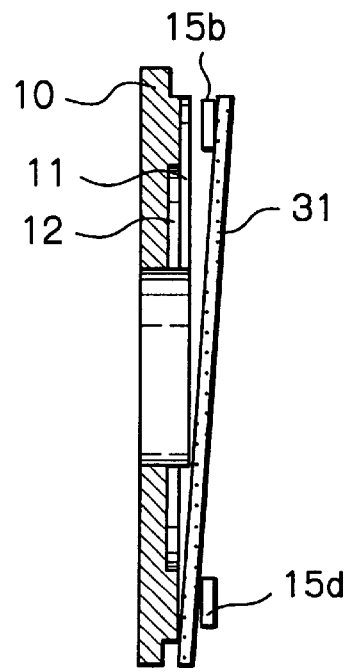
Fig. 16A    Fig. 16B

TRAY LOADING TYPE STORAGE MEDIUM DRIVE APPARATUS WITH MOVABLE CLAW PIECES FOR SUPPORTING STORAGE MEDIUM

BACKGROUND OF THE INVENTION

1. Field of the Invention

The present invention relates to a tray loading type storage medium drive apparatus for a plurality of kinds of circular storage media such as a compact-disk read-only memory (CD-ROM).

2. Description of the Related Art

In a prior art tray loading type storage medium drive apparatus, a plurality of circular recesses for accommodating a plurality of kinds of circular storage media such as a 12-cm CD-ROM medium and an 8-cm CD-ROM medium are coaxially formed on a tray. A plurality of stationary claw pieces are provided along an outer periphery of an outermost one of the circular recesses. The stationary claw pieces are partly protruding over the outer circular recess. This will be explained later in detail. When a 12-cm CD-ROM medium is mounted on the tray which is vertically installed, the 12-cm CD-ROM medium is mounted within the outer circular recess and is supported by the stationary claw pieces, so that the 12-cm CD-ROM medium does not drop from the tray.

On the other hand, when an 8-cm CD-ROM medium is mounted on a tray that is vertically installed, the stationary claw pieces cannot support the 8-cm CD-ROM medium. Therefore, a 12-cm diameter adapter for encapsulating the 8-cm CD-ROM medium will be required. Since the 12-cm diameter adapter serves as a 12-cm CD-ROM medium, the 12-cm diameter adapter can be mounted within the outer circular recess and supported by the stationary claw pieces. In this case, however, when the 12-cm diameter adapter is rotated at a high speed such as 5000 rpm, the 8-cm CD-ROM medium may become dislodged from the 12-cm diameter adapter.

SUMMARY OF THE INVENTION

It is an object of the present invention to provide a tray loading type storage medium drive apparatus capable of supporting a plurality of kinds of circular storage media without an adapter even when the tray is vertically installed.

According to the present invention, in a tray loading type storage medium drive apparatus, a plurality of circular recesses for accommodating a plurality of kinds of circular storage media having different diameters to each other are coaxially formed on a tray. A plurality of movable claw pieces are provided along an outer periphery of an outermost one of the circular recesses. The movable claw pieces are capable of partly protruding over each of the circular recesses.

BRIEF DESCRIPTION OF THE DRAWINGS

The present invention will be more clearly understood from the description set forth below, as compared with the prior art, with reference to the accompanying drawings, wherein:

FIG. 15 is a plan view of the tray loading type storage medium drive apparatus of FIG. 13 which is vertically installed and with a 12-cm CD-ROM medium mounted thereon;

FIGS. 16A and 16B are cross-sectional views taken along the line XVI—XVI in FIG. 15;

DESCRIPTION OF THE PREFERRED EMBODIMENTS

Before the description of the preferred embodiments, a prior art tray loading type storage medium drive apparatus will be explained with reference to FIGS. 1 through 6.

Figure 1:
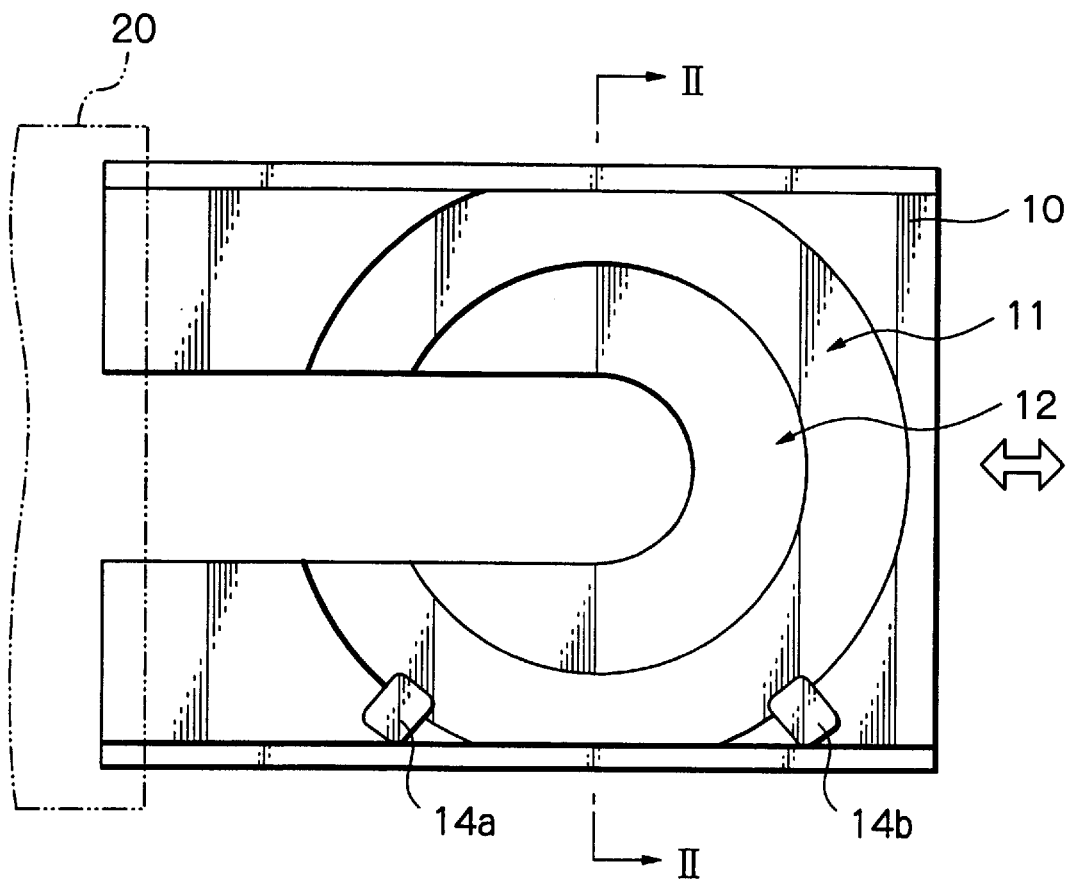
FIG. 1 is a plan view illustrating a prior art tray loading type storage medium drive apparatus.
Figure 2:
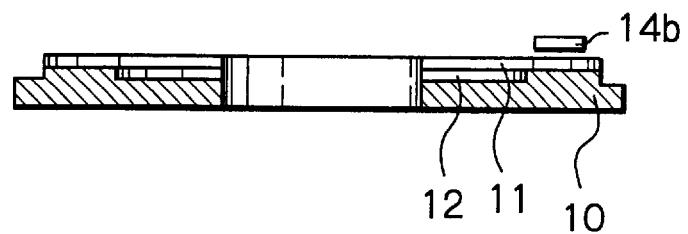
FIG. 2 is a cross-sectional view taken along the line II—II in FIG. 1.

FIG. 1 is a plan view illustrating a prior art tray loading type storage medium drive apparatus, and FIG. 2 is a cross-sectional view taken along the line II—II in FIG. 1. In FIGS. 1 and 2, reference numeral 10 designates a tray which can freely enter and leave a main body cabinet 20, as indicated by an arrow. In this case, the tray 10 is horizontally installed; however, the tray 10 can be vertically installed.

A circular recess 11 for a 12-cm CD-ROM medium and a circular recess 12 for a 8-cm CD-ROM medium are coaxially formed in the tray 10. In this case, the circular recess 12 is deeper than the circular recess 11. Also, two stationary claw pieces 14a and 14b are fixed to the outer periphery of the circular recess 11 of the tray 10 and are partly protruded over the circular recess 11.

When a 12-cm diameter CD-ROM medium or an 8-cm diameter CD-ROM medium is mounted on the tray 10 of FIGS. 1 and 2, which are horizontally installed, the 12-cm diameter CD-ROM medium or the 8-cm diameter CD-ROM medium can be seated in the circular recess 11 or 12 of the tray 10. As a result, the 12-cm diameter CD-ROM medium or the 8-cm diameter CD-ROM medium hardly drops from the tray 10 even when the tray 10 rotates at a high speed such as 5000 rpm.

Figure 3:
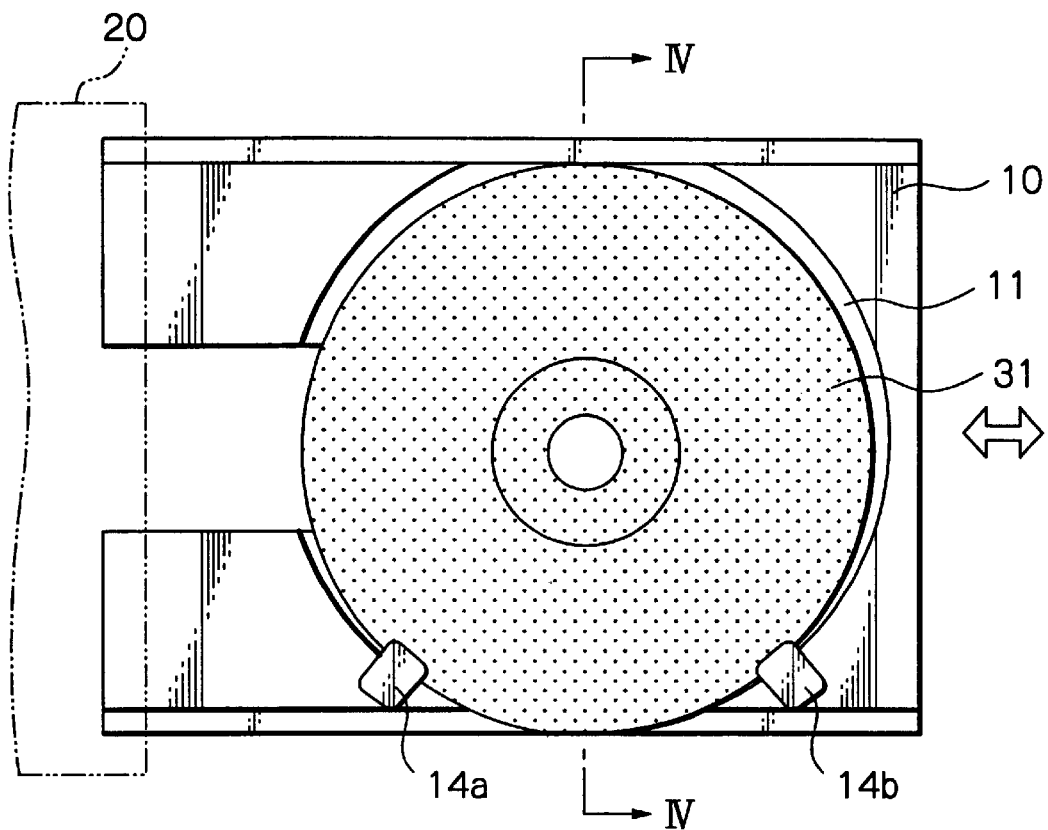
FIG. 3 is a plan view of the tray loading type storage medium drive apparatus of FIG. 1 which is vertically installed and with a 12-cm CD-ROM medium mounted thereon.
Figure 4:
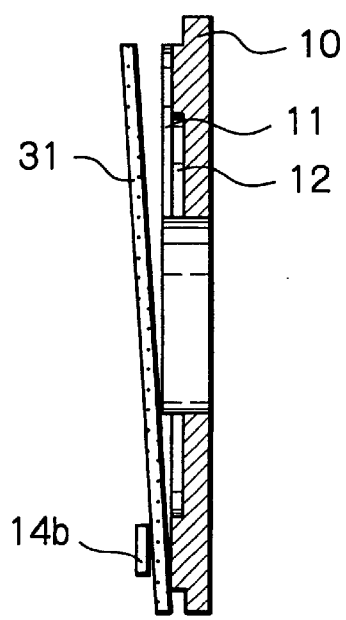
FIG. 4 is a cross-sectional view taken along the line IV—IV in FIG. 3.

When a 12-cm CD-ROM medium 31 is mounted on the tray 10 of FIGS. 1 and 2, which is vertically installed, the tray 10 of FIGS. 1 and 2 is as illustrated in FIGS. 3 and 4. That is, the 12-cm CD-ROM medium 31 is mounted within the circular recess 11 and is supported by the stationary claw pieces 14a and 14b, so that the 12-cm CD-ROM medium 31 hardly drops from the tray 10.

Figure 5:
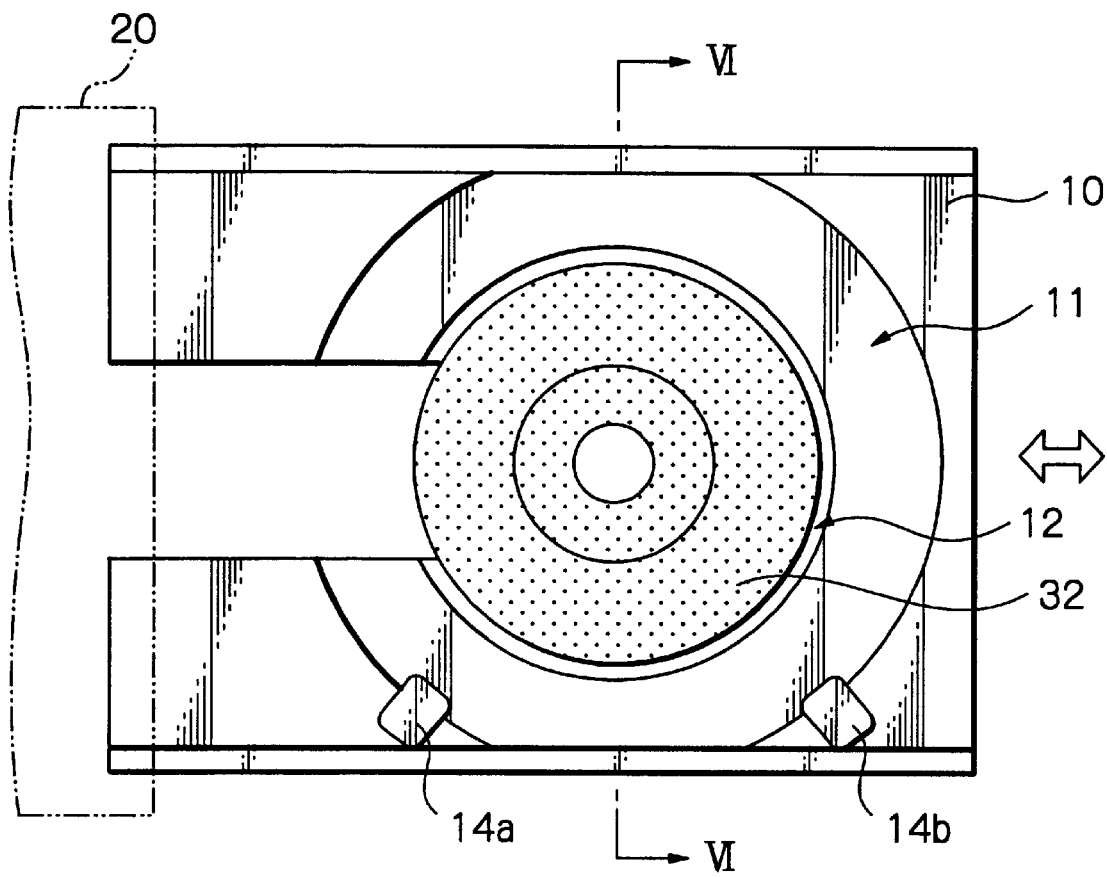
FIG. 5 is a plan view of the tray loading type storage medium drive apparatus of FIG. 1 which is horizontally, installed and with an 8-cm CD-ROM medium mounted thereon.
Figure 6:
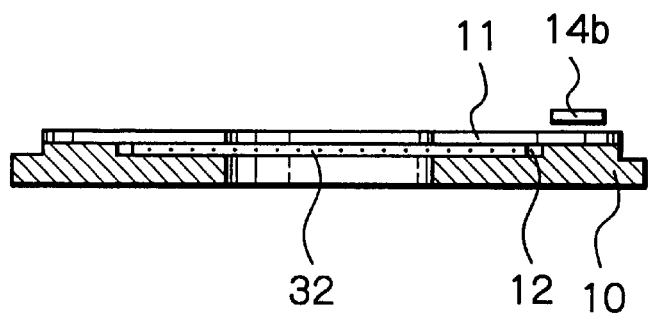
FIG. 6 is a cross-sectional view taken along the line VI—VI in FIG. 5.

On the other hand, when an 8-cm CD-ROM medium 32 is mounted on the tray 10 of FIGS. 1 and 2, which is horizontally installed, the tray 10 of FIGS. 1 and 2 is as illustrated in FIGS. 5 and 6. That is, the 8-cm CD-ROM medium 32 is mounted within the circular recess 12 without the support of the stationary claw pieces 14a and 14b. In this case, since the tray 10 is horizontally installed, the 8-cm CD-ROM medium 32 hardly drops from the tray 10. Note that the tray 10 of FIGS. 5 and 6, can not be vertically installed, since the stationary claw pieces 14a and 14b cannot support the 8-cm CD-ROM medium 32.

If the 8-cm CD-ROM medium 32 is mounted on the tray 10 of FIGS. 1 and 2, which is vertically installed, a 12-cm diameter adapter for encapsulating the 8-cm CD-ROM medium 32 will be required. Since the 12-cm diameter adapter serves as a 12-cm CD-ROM medium, the 12-cm diameter adapter can be mounted within the circular recess 11 and supported by the stationary claw pieces 14a and 14b. In this case, however, when the 12-cm diameter adapter is rotated at a high speed such as 5000 rpm, the 8-cm CD-ROM medium 31 may become dislodged from the 12-cm diameter adapter.

Figure 7:
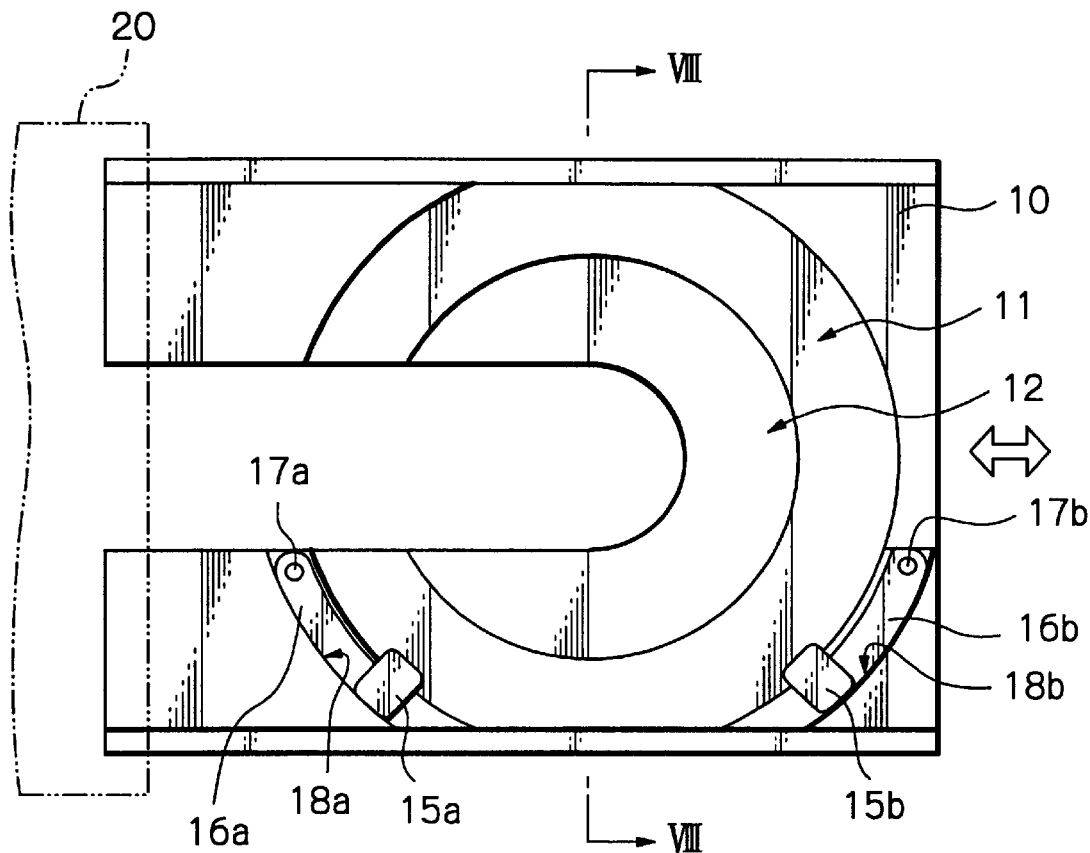
FIG. 7 is a plan view illustrating a first embodiment of the loading type storage medium drive apparatus according to the present invention.
Figure 8:
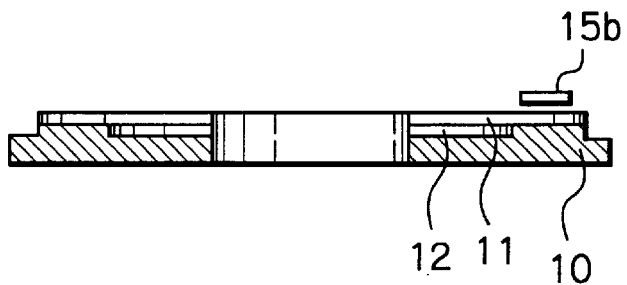
FIG. 8 is a cross-sectional view taken along the line VIII—VIII in FIG. 7.

FIG. 7 is a plan view illustrating a first embodiment of the tray loading type storage medium drive apparatus according to the present invention, and FIG. 8 is a cross-sectional view taken along the line VIII—VIII in FIG. 7. In FIGS. 7 and 8, two movable claw pieces 15a and 15b are provided instead of the stationary claw pieces 14a and 14b of FIGS. 1 and 2. That is, the movable claw piece 15a is fixed to an end of a supporting arm 16a whose other end is coupled to a rotating axis 17a. In this case, a recess 18a for accommodating the supporting arm 16a is provided on the tray 10 along the outer periphery of the recess 11. Similarly, the movable claw piece 15b is fixed to an end of a supporting arm 16b whose other end is coupled to a rotating axis 17b. In this case, a recess 18b for accommodating the supporting arm 16b is provided on the tray 10 along the outer periphery of the recess 11. Note that the supporting arms 16a and 16b are symmetrically arranged.

FIGS. 7 and 8 show a state where the tray 10 is horizontally installed. Therefore, the supporting arms 16a and 16b are accommodated in the recesses 18a and 18b, respectively. As a result, even when 12-cm CD-ROM medium or an 8-cm CD-ROM medium is mounted on the circular recess 11 or 12, the movable claw pieces 15a and 15b do not obstruct the 12-cm CD-ROM medium or the 8-cm CD-ROM medium.

Figure 9:
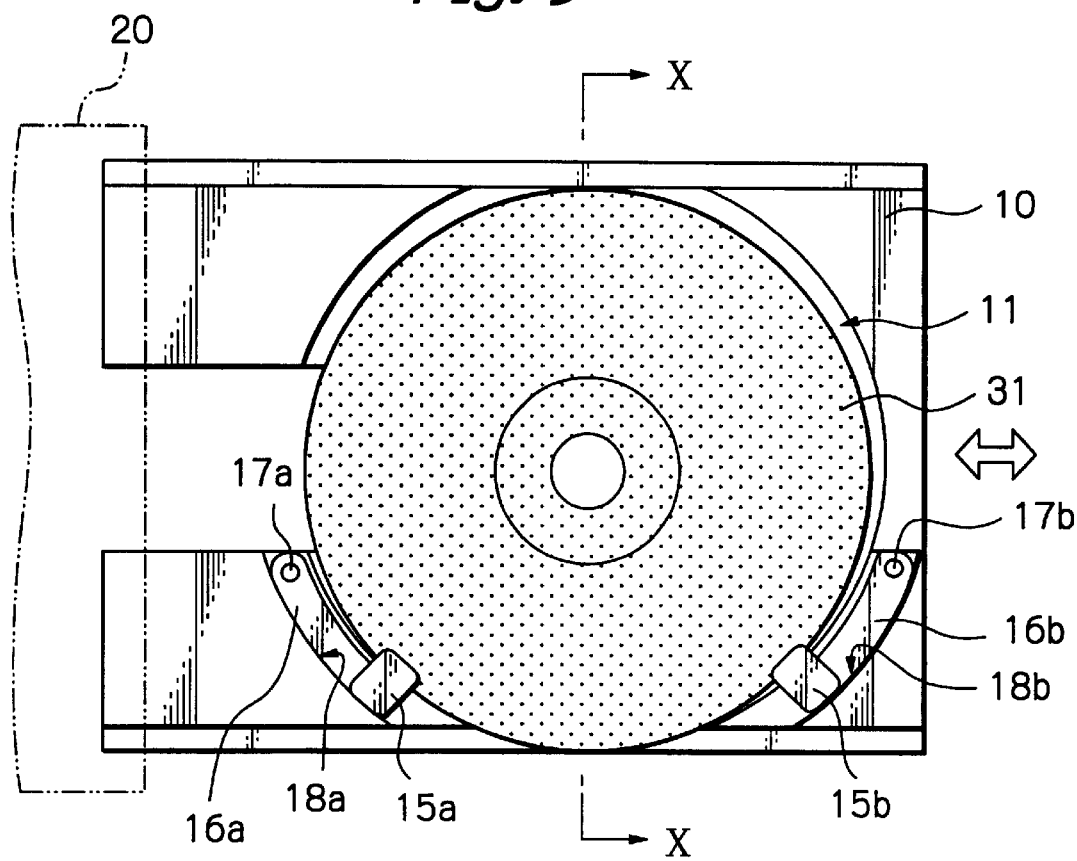
FIG. 9 is a plan view of the tray loading type storage medium drive apparatus of FIG. 7 which is vertically installed and with a 12-cm CD-ROM medium mounted thereon.
Figure 10:
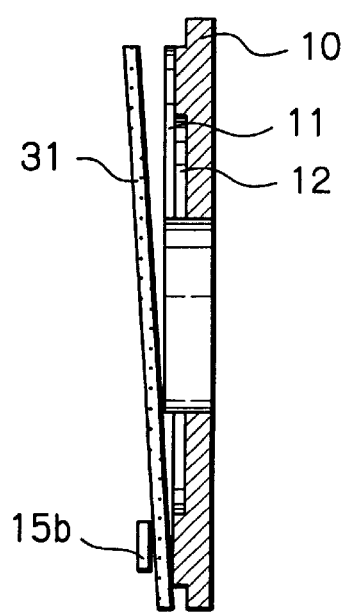
FIG. 10 is a cross-sectional view taken along the lines IV—IV in FIG. 9.

When a 12-cm CD-ROM medium 31 is mounted on the tray 10 of FIGS. 7 and 8, which is vertically installed, the tray 10 of FIGS. 7 and 8 is as illustrated in FIGS. 9 and 10. That is, the movable claw pieces 15a and 15b are set in advance so that the movable claw pieces 15a and 15b are partly protruded over the circular recess 11. Therefore, the 12-cm CD-ROM medium 31 is mounted within the circular recess 11 and is supported by the movable claw pieces 14a and 14b, so that the 12-cm CD-ROM medium 31 hardly drops from the tray 10.

Figure 11:
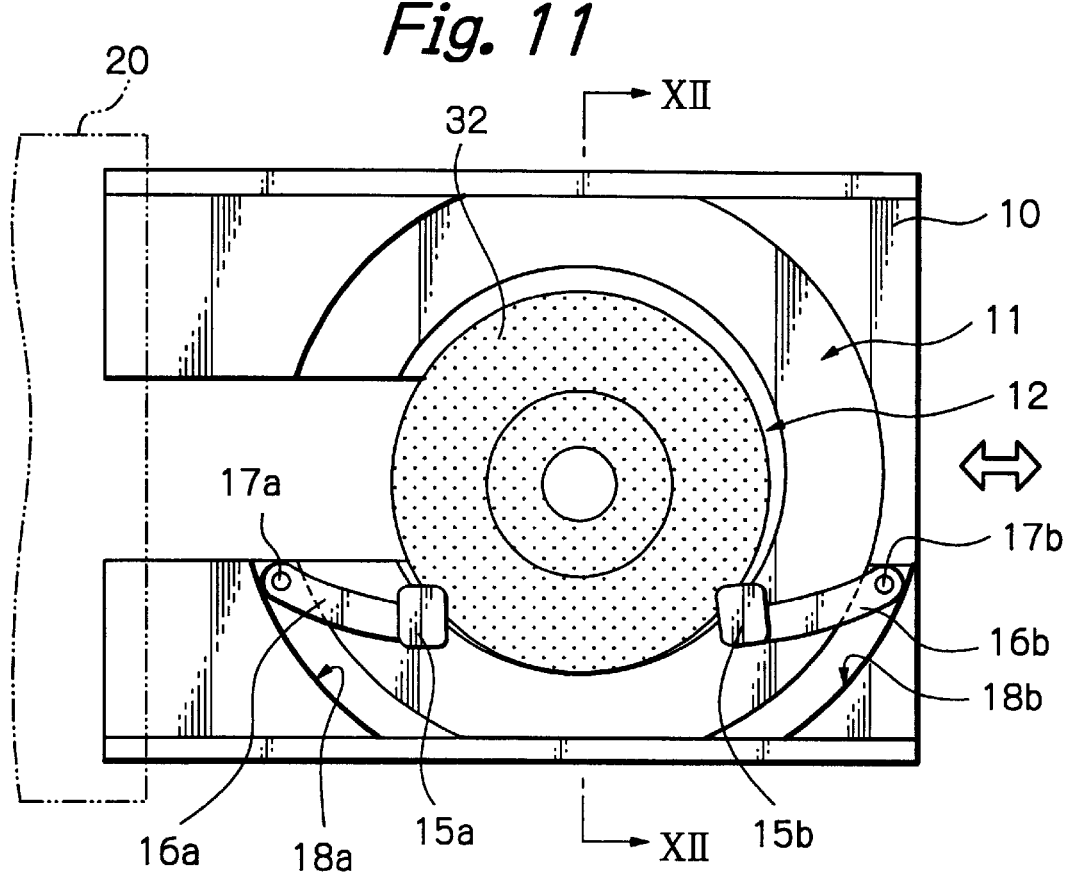
FIG. 11 is a plan view of the tray loading type storage medium drive apparatus of FIG. 7 which is vertically, installed and with an 8-cm CD-ROM medium mounted thereon.
Figure 12:
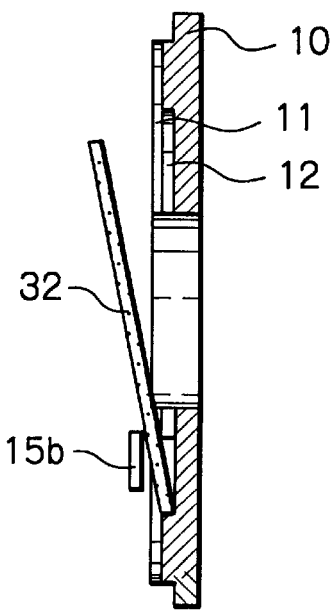
FIG. 12 is a cross-sectional view taken along the line XII—XII in FIG. 11.

On the other hand, when, an 8-cm CD-ROM medium 32 is mounted on the tray 10 of FIGS. 7 and 8, which is vertically installed, the tray 10 of FIGS. 7 and 8 is as illustrated in FIGS. 11 and 12. That is, the movable claw pieces 15a and 15b are set in advance so that the movable claw pieces 15a and 15b are partly protruded over the circular recess 12. Therefore, the 8-cm CD-ROM medium 32 is mounted within the circular recess 12 and is supported by the movable claw pieces 14a and 14b, so that the 8-cm CD-ROM medium 32 hardly drops from the tray 10.

Figure 13:
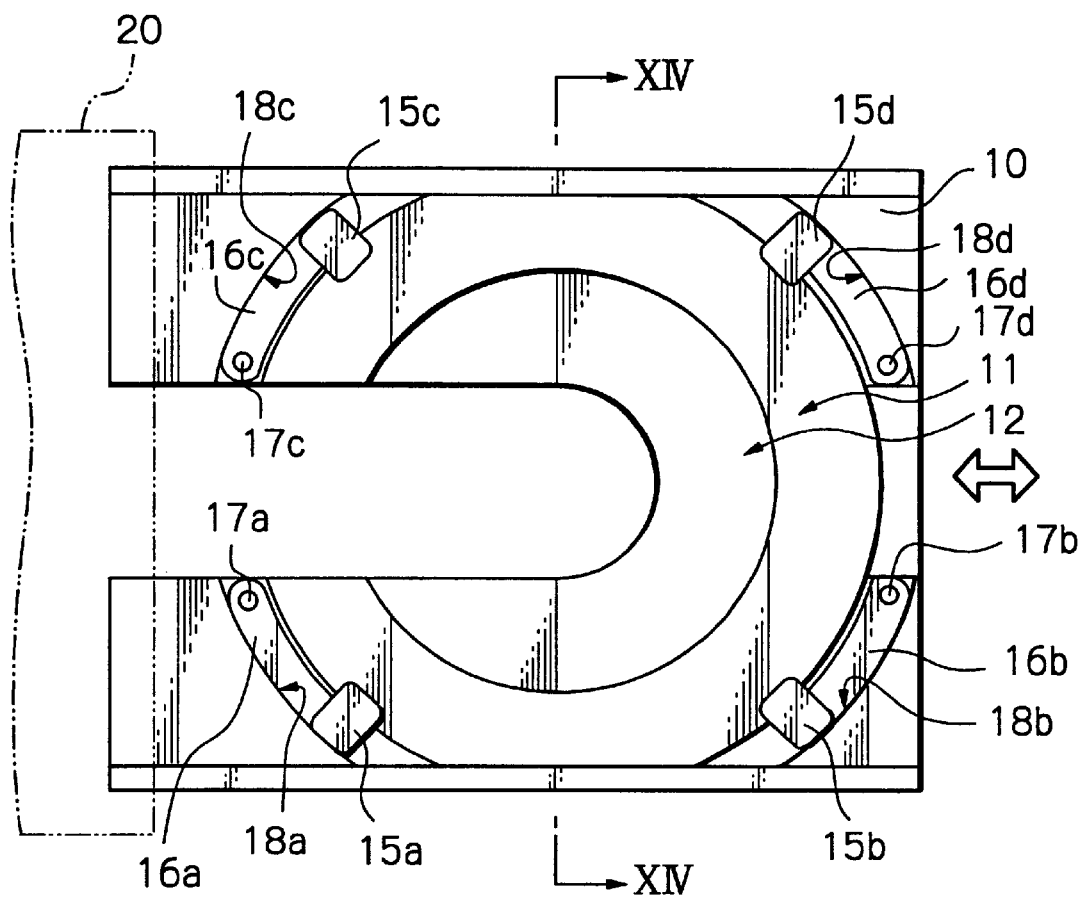
FIG. 13 is a plan view illustrating a second embodiment of the loading type storage medium drive apparatus according to the present invention.
Figure 14:
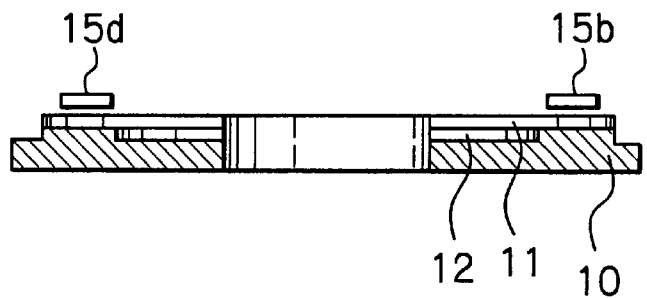
FIG. 14 is a cross-sectional view taken along the line XIV—XIV in FIG. 13.

FIG. 13 is a plan view illustrating a second embodiment of the tray loading type storage medium drive apparatus according to the present invention, and FIG. 14 is a cross-sectional view taken along the line XIV—XIV in FIG. 13. In FIGS. 13 and 14, two movable claw pieces 15c and 15d are added to the movable claw pieces 15a and 15b of FIGS. 7 and 8. That is, the movable claw piece 15c is fixed to an end of a supporting arm 16c whose other end is coupled to a rotating axis 17c opposite to the rotating axis 17a. In this case, a recess 18c for accommodating the supporting arm 16c is provided on the tray 10 along the outer periphery of the recess 11. Similarly, the movable claw piece 15d is fixed to an end of a supporting arm 16d whose other end is coupled to a rotating axis 17d opposite to the rotating axis 17b. In this case, a recess 18d for accommodating the supporting arm 16d is provided on the tray 10 along the outer periphery of the recess 11. Note that the supporting arms 16c and 16d are symmetrically arranged and opposite to the supporting arms 16a and 16b, respectively.

FIGS. 13 and 14 show a state where the tray 10 is horizontally installed. Therefore, the supporting arms 16a, 16b, 16c and 16d are accommodated in the recesses 18a, 18b, 18c and 18d, respectively. As a result, even when 12-cm CD-ROM medium or an 8-cm CD-ROM medium is mounted on the circular recess 11 or 12, the movable claw pieces 15a, 15b, 15c and 15d do not obstruct the 12-cm CD-ROM medium or the 8-cm CD-ROM medium.

When, a 12-cm CD-ROM medium 31 is mounted on the tray 10 of FIGS. 13 and 14, which is vertically installed, the tray 10 of FIGS. 13 and 14 is as illustrated in FIGS. 15 and 16A. In this case, the movable claw pieces 15a and 15b are below the movable claw pieces 15c and 15d. That is, the movable claw pieces 15a and 15b are set in advance so that the movable claw pieces 15a and 15b are partly protruded over the circular recess 11. Therefore, the 12-cm CD-ROM medium 31 is mounted within the circular recess 11 and is supported by the movable claw pieces 15a and 15b, so that the 12-cm CD-ROM medium 31 hardly drops from the tray 10.

Also, if the movable claw pieces 15c and 15d are below the movable claw pieces 15a and 15b as illustrated in FIG. 16B, the movable claw pieces 15c and 15d are set in advance so that the movable claw pieces 15c and 15d are partly protruded over the circular recess 11. Therefore, the 12-cm CD-ROM medium 31 is mounted within the circular recess 11 and is supported by the movable claw pieces 15c and 15d, so that the 12-cm CD-ROM medium 31 hardly drops from the tray 10.

Figure 17:
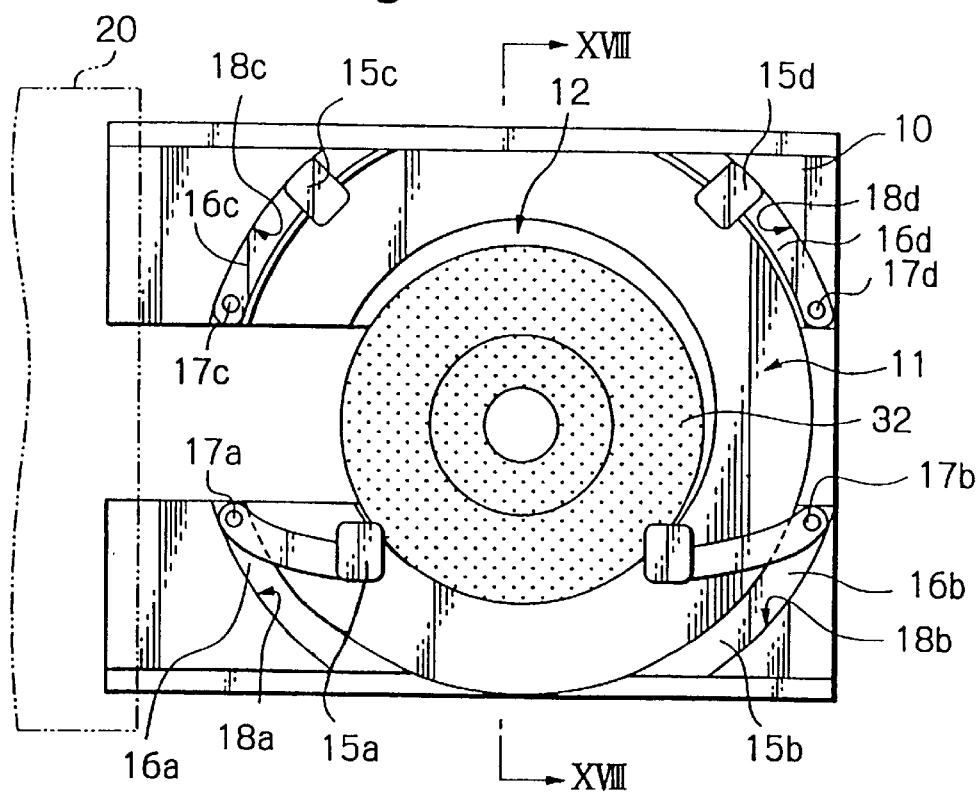
FIG. 17 is a plan view of the tray loading type storage medium drive apparatus of FIG. 13 which is vertically, installed and with an 8-cm CD-ROM medium mounted thereon.
Figure 18A:
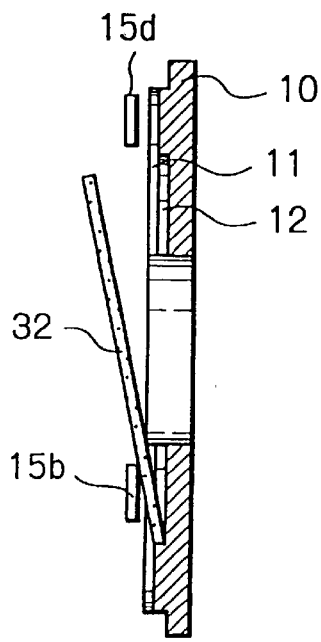
FIGS. 18A and 18B are cross-sectional views taken along the line XVIII—XVIII in FIG. 17.

When, an 8-cm CD-ROM medium 32 is mounted on the tray 10 of FIGS. 13 and 14, which is vertically installed, the tray 10 of FIGS. 13 and 14 is illustrated in FIGS. 17 and 18A. In this case, the movable claw pieces 15a and 15b are below the movable claw pieces 15c and 15d. That is, the movable claw pieces 15a and 15b are set in advance so that the movable claw pieces 15a and 15b are partly protruded over the circular recess 12. Therefore, the 8-cm CD-ROM medium 32 is mounted within the circular recess 11 and is supported by the movable claw pieces 15a and 15b, so that the 8-cm CD-ROM medium 32 hardly drops from the tray 10.

Figure 18B:
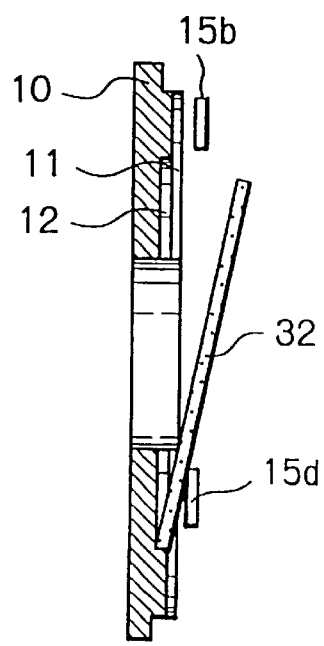

Also, if the movable claw pieces 15c and 15d are below the movable claw pieces 15a and 15b as illustrated in FIG. 18B, the movable claw pieces 15c and 15d are set in advance so that the movable claw pieces 15c and 15d are set in advance so that the movable claw pieces 15c and 15d are partly protruded over the circular recess 12. Therefore, the 8-cm CD-ROM medium 31 is mounted within the circular recess 12 and is supported by the movable claw pieces 15c and 15d, so that the 12-cm CD-ROM medium 31 hardly drops from the tray 10.

In the above-described embodiments, the circular recesses 11 and 12 for a 12-cm CD-ROM medium and an 8-cm CD-ROM medium, respectively, are provided on the tray 10; however, the present invention can be applied to a tray on which two circular recesses for other CD-ROM media or the like are provided. Also, the present invention can be applied to a tray on which three or more circular recesses are provided. Further, the present invention can be applied to storage media other than CD-ROM media.

As explained hereinabove, according to the present invention, since a plurality of movable claw pieces are provided on a tray, a plurality of storage media having different diameters can be mounted on the tray even when the tray is vertically installed.

What is claimed is:

1. A tray loading type storage medium drive apparatus comprising:
    a tray on which a plurality of circular recesses, which accommodate one of a plurality of kinds of circular storage media having different diameters to each other are coaxially formed;
    a plurality of movable claw pieces provided along an outer periphery of an outermost one of said circular recesses, said movable claw pieces capable of partly protruding over each of said circular recesses; and
    a plurality of supporting arms, each having an end fixed to one of said movable claw pieces and an end rotatably fixed to said tray so as to rotate in a plane substantially parallel to the storage media.

2. The apparatus as set forth in claim 1, wherein a plurality of recesses are formed along an outer periphery of said outermost circular recess on said tray to accommodate said supporting arms.

3. A tray loading type storage medium drive apparatus comprising:
    a tray on which a plurality of circular recesses, which accommodate one of a plurality of kinds of circular storage media having different diameters to each other are coaxially formed; and
    first and second movable claw pieces provided along an outer periphery of an outermost one of said circular recesses, said first and second movable claw pieces capable of partly protruding over each of said circular recesses,
    said first and second movable claw pieces being symmetrically arranged on a first side of said tray; and
    first and second supporting arms, each having an end fixed to said first and second movable claw pieces, respectively and an end rotatably fixed to said tray so as to rotate in a plane substantially parallel to the storage media.

4. The apparatus as set forth in claim 3, wherein first and second recesses are formed along an outer periphery of said outermost circular recess on said tray to accommodate said first and second supporting arms.

5. A tray loading type storage medium drive apparatus comprising:
    a tray on which a plurality of circular recesses for accommodating a plurality of kinds of circular storage media having different diameters to each other are coaxially formed; and
    first and second movable claw pieces provided along an outer periphery of an outermost one of said circular recesses, said first and second movable claw pieces capable of partly protruding over each of said circular recesses,
    said first and second movable claw pieces being symmetrically arranged on a first side of said tray; and
    first and second supporting arms, each having an end fixed to said first and second movable claw pieces, respectively and an end rotatably fixed to said tray,
    further comprising third and fourth movable claw pieces provided along the outer periphery of said outermost circular recess, said third and fourth movable claw pieces capable of partly protruding over each of said circular recesses,
    said third and fourth movable claw pieces being symmetrically arranged on a second side of said tray opposite to said first side of said tray.

6. The apparatus as set forth in claim 5, further comprising third and fourth supporting arms, each having an end fixed to said third and fourth movable claw pieces, respectively and an end rotatably fixed to said tray.

7. The apparatus as set forth in claim 6, wherein third and fourth recesses are formed along an outer periphery of said outermost circular recess on said tray to accommodate said third and fourth supporting arms.

8. A tray loading type storage medium drive apparatus comprising:
    a tray on which first and second circular recesses, which accommodate one of a 12-cm compact-disk storage medium and an 8-cm compact-disk storage medium are coaxially formed; and
    first and second movable claw pieces provided along an outer periphery of said first circular recess, said first and second movable claw pieces capable of partly protruding over each of said first and second circular recesses,
    said first and second movable claw pieces being symmetrically arranged on a first side of said tray; and
    first and second supporting arms, each having an end fixed to said first and second movable claw pieces, respectively and an end rotatably fixed to said tray so as to rotate in a plane substantially parallel to the storage media.

9. The apparatus as set forth in claim 8, wherein first and second recesses are formed along an outer periphery of said first circular recess on said tray to accommodate said first and second supporting arms.

10. A tray loading type storage medium drive apparatus comprising:
- a tray on which first and second circular recesses, which accommodate one of a 12-cm compact-disk storage medium and an 8-cm compact-disk storage medium are coaxially formed; and
- first and second movable claw pieces provided along an outer periphery of said first circular recess, said first and second movable claw pieces capable of partly protruding over each of said first and second circular recesses,
- said first and second movable claw pieces being symmetrically arranged on a first side of said tray; and
- first and second supporting arms, each having an end fixed to said first and second movable claw pieces, respectively and an end rotatably fixed to said tray,
- further comprising third and fourth movable claw pieces provided along the outer periphery of said outermost circular recess, said third and fourth movable claw pieces capable of partly protruding over each of said circular recesses,
- said third and fourth movable claw pieces being symmetrically arranged on a second side of said tray opposite to said first side of said tray.

11. The apparatus as set forth in claim 10, further comprising third and fourth supporting arms, each having an end fixed to said third and fourth movable claw pieces, respectively and an end rotatably fixed to said tray.

12. The apparatus as set forth in claim 11, wherein third and fourth recesses are formed along an outer periphery of said first circular recess on said tray to accommodate said third and fourth supporting arms.

* * * * *